United States Patent
Machida et al.

(10) Patent No.: US 7,458,348 B2
(45) Date of Patent: Dec. 2, 2008

(54) METHOD AND APPARATUS FOR CONTROLLING VARIABLE VALVE ACTUATION DEVICE IN INTERNAL COMBUSTION ENGINE

(75) Inventors: Kenichi Machida, Isesaki (JP); Hidekazu Yoshizawa, Isesaki (JP)

(73) Assignee: Hitachi, Ltd., Tokyo (JP)

( * ) Notice: Subject to any disclaimer, the term of this patent is extended or adjusted under 35 U.S.C. 154(b) by 115 days.

(21) Appl. No.: 11/389,502

(22) Filed: Mar. 27, 2006

(65) Prior Publication Data
US 2006/0219197 A1 Oct. 5, 2006

(30) Foreign Application Priority Data
Mar. 28, 2005 (JP) ............................ 2005-090616
Mar. 28, 2005 (JP) ............................ 2005-090617

(51) Int. Cl.
F01L 1/34 (2006.01)
(52) U.S. Cl. ............... 123/90.16; 123/90.15; 123/345; 123/346; 123/347; 123/348; 701/103; 701/105
(58) Field of Classification Search ............... 123/90.16
See application file for complete search history.

(56) References Cited
U.S. PATENT DOCUMENTS
6,843,230 B2 * 1/2005 Iizuka et al. ........... 123/406.46
6,851,409 B2 * 2/2005 Machida et al. ............. 123/399
6,863,050 B2 * 3/2005 Iizuka et al. ................. 123/345
7,077,085 B2 * 7/2006 Arai et al. ................. 123/90.16
7,191,050 B2 * 3/2007 Machida ..................... 701/103

FOREIGN PATENT DOCUMENTS
JP  11-82073 A   3/1999
JP  11-210510 A  8/1999

* cited by examiner

*Primary Examiner*—Thomas E Denion
*Assistant Examiner*—Kyle M Riddle
(74) *Attorney, Agent, or Firm*—Foley & Lardner LLP

(57) ABSTRACT

In a V-type engine provided with a variable valve timing mechanism and variable valve lift mechanism for an intake valve, a torque difference between respective banks is obtained. In a region in which an opening area of the intake valve is larger than a threshold, valve timing of the intake valve by the variable valve timing mechanism is corrected so as to reduce the torque difference, whereas in a region in which the opening area of the intake valve is smaller than the threshold, lift characteristics of the intake valve by the variable valve lift mechanism is corrected so as to reduce the torque difference.

13 Claims, 15 Drawing Sheets

METHOD AND APPARATUS FOR CONTROLLING VARIABLE VALVE ACTUATION DEVICE IN INTERNAL COMBUSTION ENGINE

BACKGROUND OF THE INVENTION

1. Field of the Invention

The present invention relates to a technology for controlling a variable valve actuation device which variably changes a phase of the center of an operating angle of an intake valve, and lift characteristics of the intake valve.

2. Description of the Related Art

Japanese Unexamined Patent Publication No. 11-210510 discloses a technology for learning an output value of a lift sensor at a fully opened position of an engine valve and a fully closed position thereof, in a variable valve actuation device which operates the engine valve to open or close by means of a solenoid coil.

Further, Japanese Unexamined Patent publication No. 11-82073 discloses a technology for learning the most retarded angle position of valve timing for each operating region of an engine, in a variable valve actuation device which adjusts a phase difference of a camshaft to a crankshaft.

According to the above conventional technologies, the fully closed position of the engine valve and the fully opened position thereof or the most retarded angle position of the valve timing, can be accurately detected.

However, it is impossible to detect the deviation of the fully closed position of the engine valve or the fully opened position thereof from a desired position, or the deviation of the most retarded angle position of the valve timing from a desired position.

Accordingly, in the case where the variable valve actuation device is provided in each bank in a V-type engine, a difference in intake air quantity may occur between each bank, to thereby reduce the engine rotation stability or the silence of the engine.

Therefore, it is desired that the variable valve actuation device on each bank is corrected based on the difference in intake air quantity between each bank.

However, in an engine provided with a variable valve lift mechanism which varies lift characteristics (a lift amount and/or an operating angle) of an intake valve, and a variable valve timing mechanism which changes a phase of an intake camshaft relative to a crankshaft, an intake air quantity is changed by both of an influence of the lift characteristics of the intake valve and an influence of a phase of the center of the operating angle of the intake valve.

Therefore, there is a problem in that the variable valve lift mechanism and the variable valve timing mechanism cannot be corrected appropriately.

SUMMARY OF THE INVENTION

In view of the above problem, the present invention has an object to perform individually, in an engine provided with a variable valve actuation device which variably changes a phase of the center of an operating angle of an intake valve, and lift characteristics of the intake valve, the correction for coping with an error in the phase of the center of the operating angle and the correction for coping with an error in the lift characteristics.

In order to achieve the above object, in the present invention, whether the learning of an error in intake air quantity which depends on a phase of the center of an operating angle of an intake valve is performed or the learning of an error in intake air quantity which depends on lift characteristics of the intake valve is performed, is switched to each other based on a quantity of state of an intake system in an engine.

The other objects and features of this invention will become understood from the following description with reference to the accompanying drawings.

DESCRIPTION OF PREFERRED EMBODIMENTS

Figure 1:
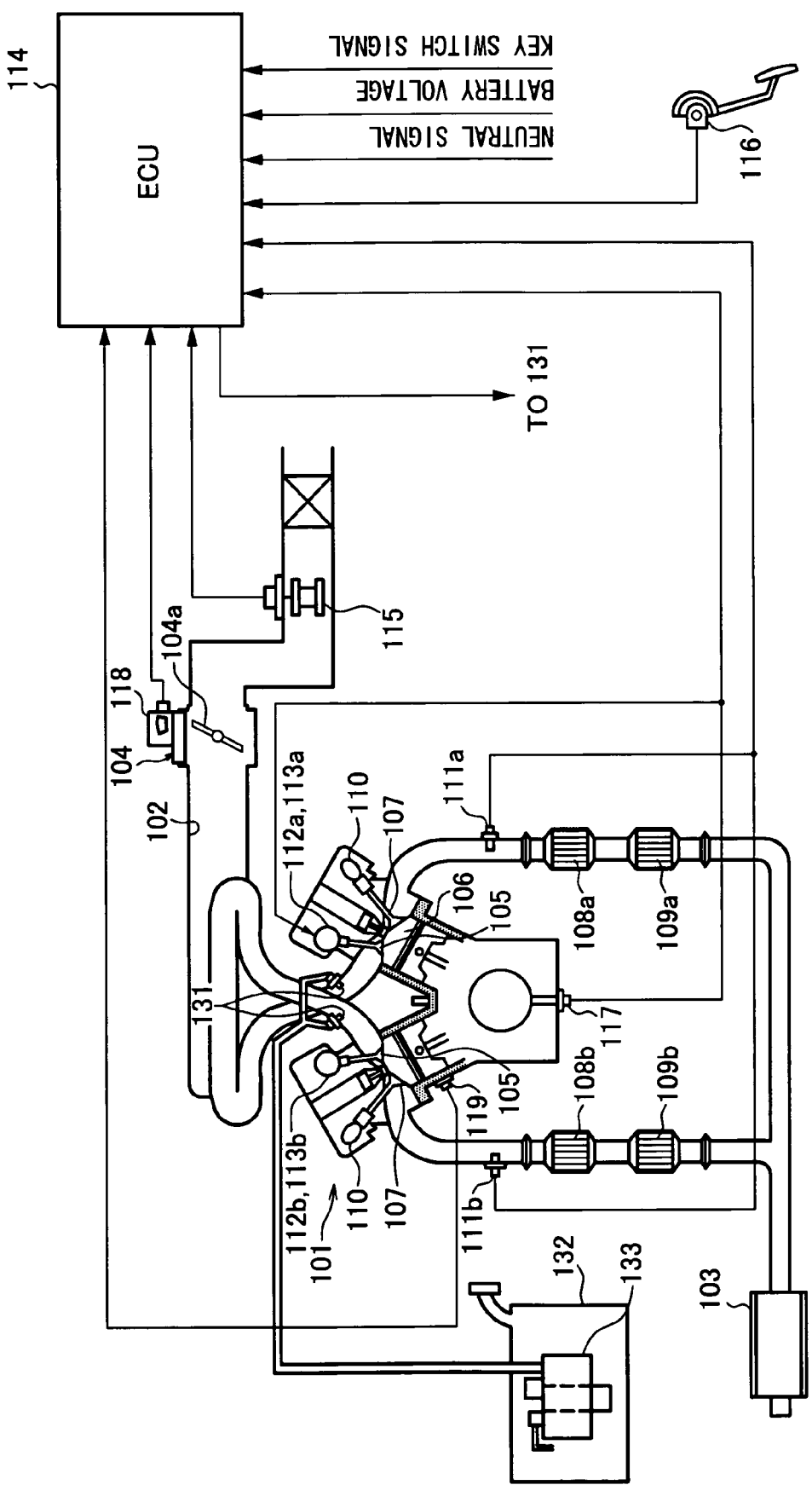
FIG. 1 is a systematic diagram of a V-type engine in an embodiment of the present invention.

FIG. 1 is a systematic diagram showing an internal combustion engine for vehicle in an embodiment.

In FIG. 1, an internal combustion engine 101 is a V-type engine provided with right bank and left bank. However, internal combustion engine 101 may be a horizontally opposed engine.

In an intake pipe 102 of engine 101, an electronically controlled throttle 104 is disposed. Air having passed through electronically controlled throttle 104 is distributed to each bank, and thereafter, is distributed to each cylinder.

In each cylinder, the air is suctioned into a combustion chamber 106 via an intake valve 105.

The gas having combusted in combustion chamber 106 is discharged via an exhaust valve 107 and thereafter, is flown together for each bank, to be purified by a front catalyst 108a, 108b and a rear catalyst 109a, 109b, which are disposed in each bank.

The exhaust air for each bank after purified by rear catalyst 109a, 109b is flown together, to be flown into a muffler 103, and thereafter, is discharged into the atmosphere.

Exhaust valve 107 is driven to open or close, while maintaining a fixed lift amount, a fixed operating angle and fixed timing thereof by a cam supported on an exhaust camshaft 110.

On the other hand, there is disposed in each bank, a variable valve lift mechanism 112a, 112b which continuously variably controls a lift amount of each intake valve 105 as well as an operating angle thereof.

Further, there is disposed in each bank, a variable valve timing mechanism 113a, 113b which is capable of continuously varying a phase of the center of the operating angle of intake valve 105.

Variable valve lift mechanism 112a and variable valve timing mechanism 113a are combined with each other, and variable valve lift mechanism 112b and variable valve timing mechanisms 113b are combined with each other, so that a variable valve actuation device for intake valves 105 in respective banks is configured.

An electronic control unit (ECU) 114 which incorporates therein a microcomputer, controls electronically controlled throttle 104, variable valve lift mechanisms 112a and 112b, and variable valve timing mechanisms 113a and 113b, so that a target intake air quantity corresponding to an accelerator opening can be obtained.

Electronic control unit 114 receives detection signals from an air flow meter 115 for detecting an intake air flow quantity of engine 101, an accelerator sensor 116 for detecting a depression amount of an accelerator pedal, a crank angle sensor 117 for detecting a rotating angle of a crankshaft, a throttle sensor 118 for detecting an opening TVO of a throttle valve 104a, a water temperature sensor 119 for detecting the cooling water temperature of engine 101, and an oxygen sensor 111a, 111b for detecting an air-fuel ratio in each bank, based on the oxygen concentration in the exhaust gas.

A fuel injection valve 131 is disposed on an intake port on the upstream side of intake valve 105 in each cylinder.

To fuel injection valve 131, fuel in a fuel tank 132 is supplied under pressure by a fuel pump 133. When fuel injection valve 131 is driven to open based on an injection pulse signal from electronic control unit 114, the fuel of a quantity proportional to injection pulse width.

Figure 2:
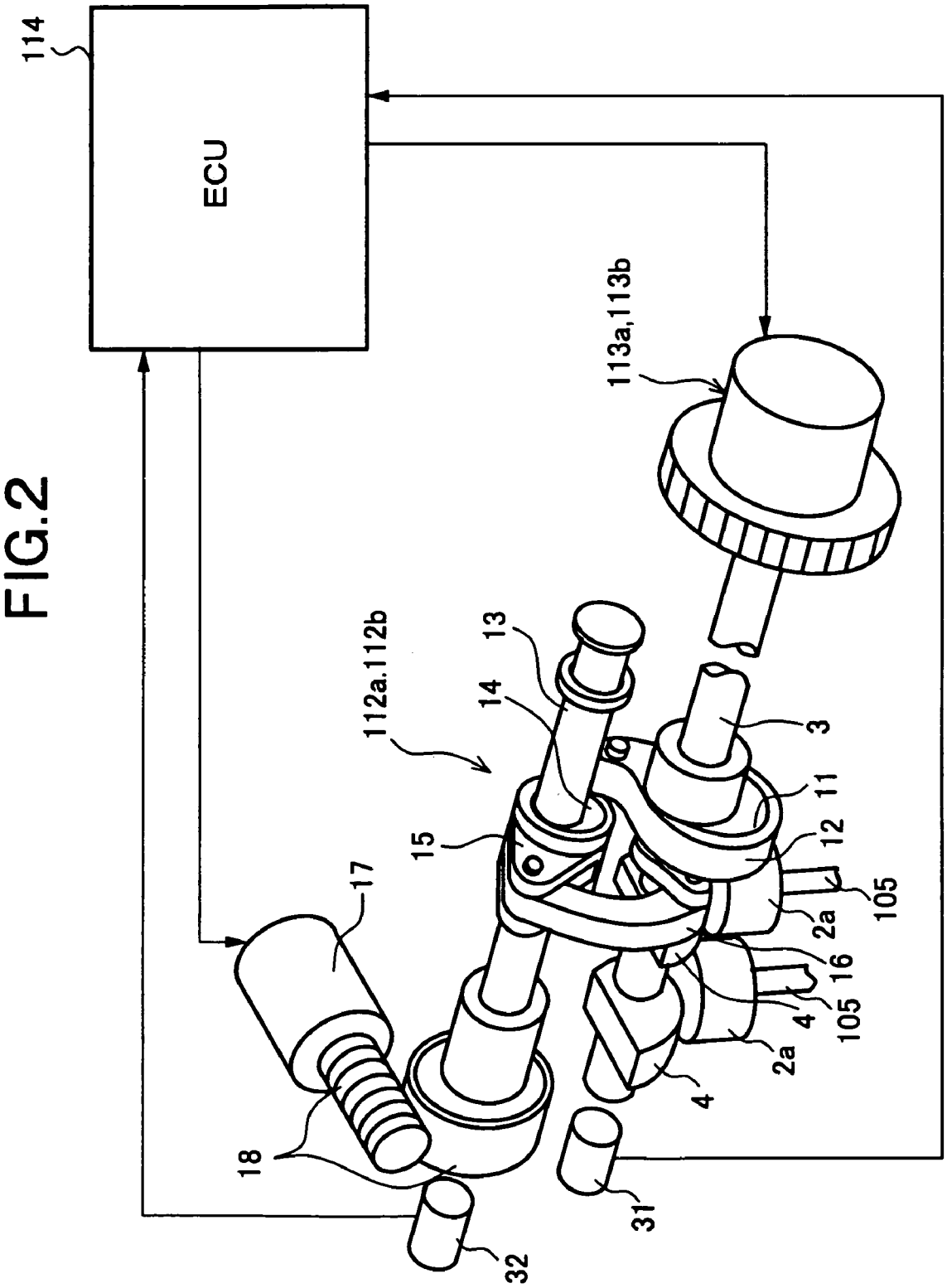
FIG. 2 is a perspective view showing a variable valve lift mechanism in the embodiment of the present invention.
Figure 3:
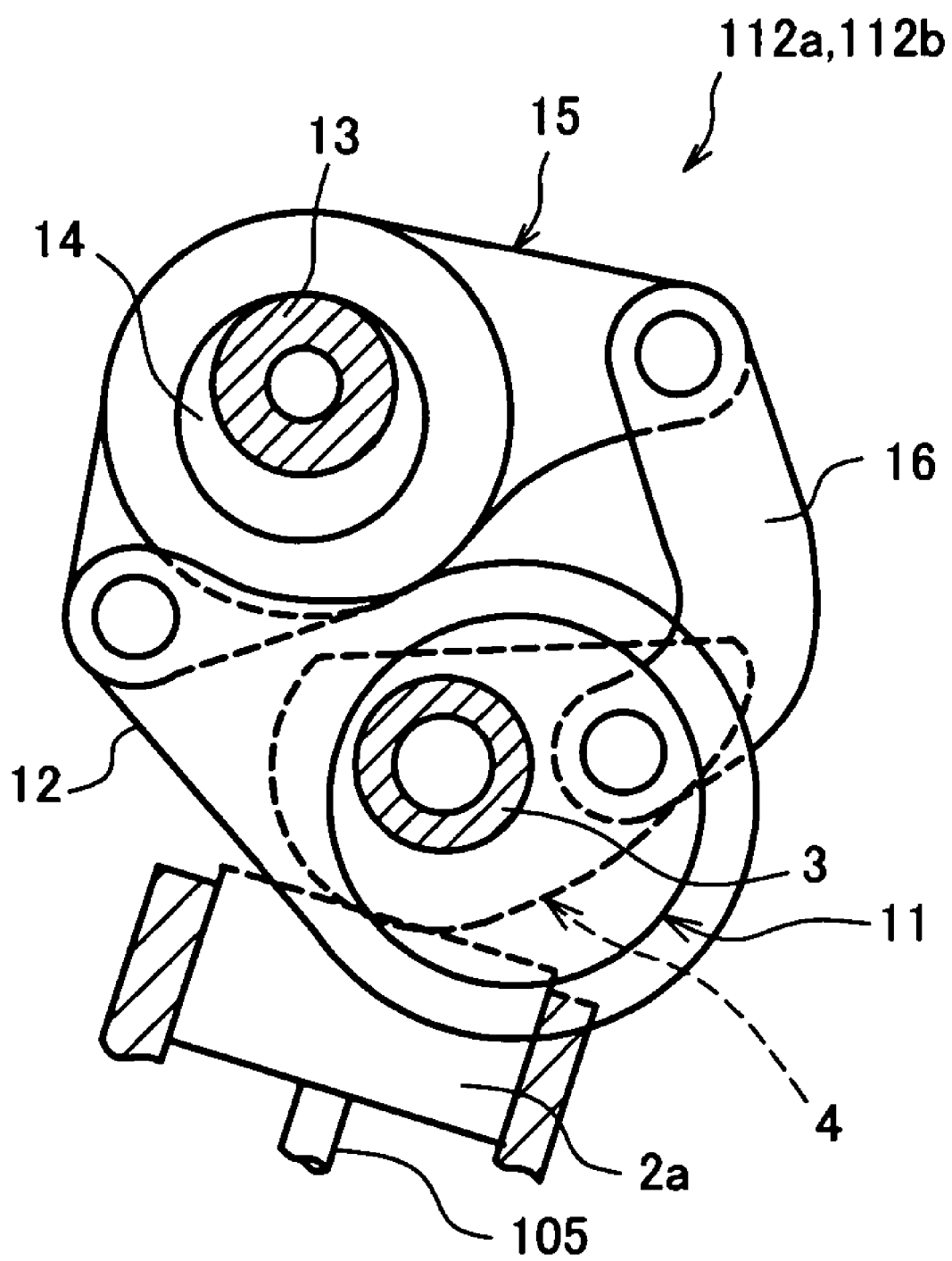
FIG. 3 is a side view of the variable valve lift mechanism.
Figure 4:
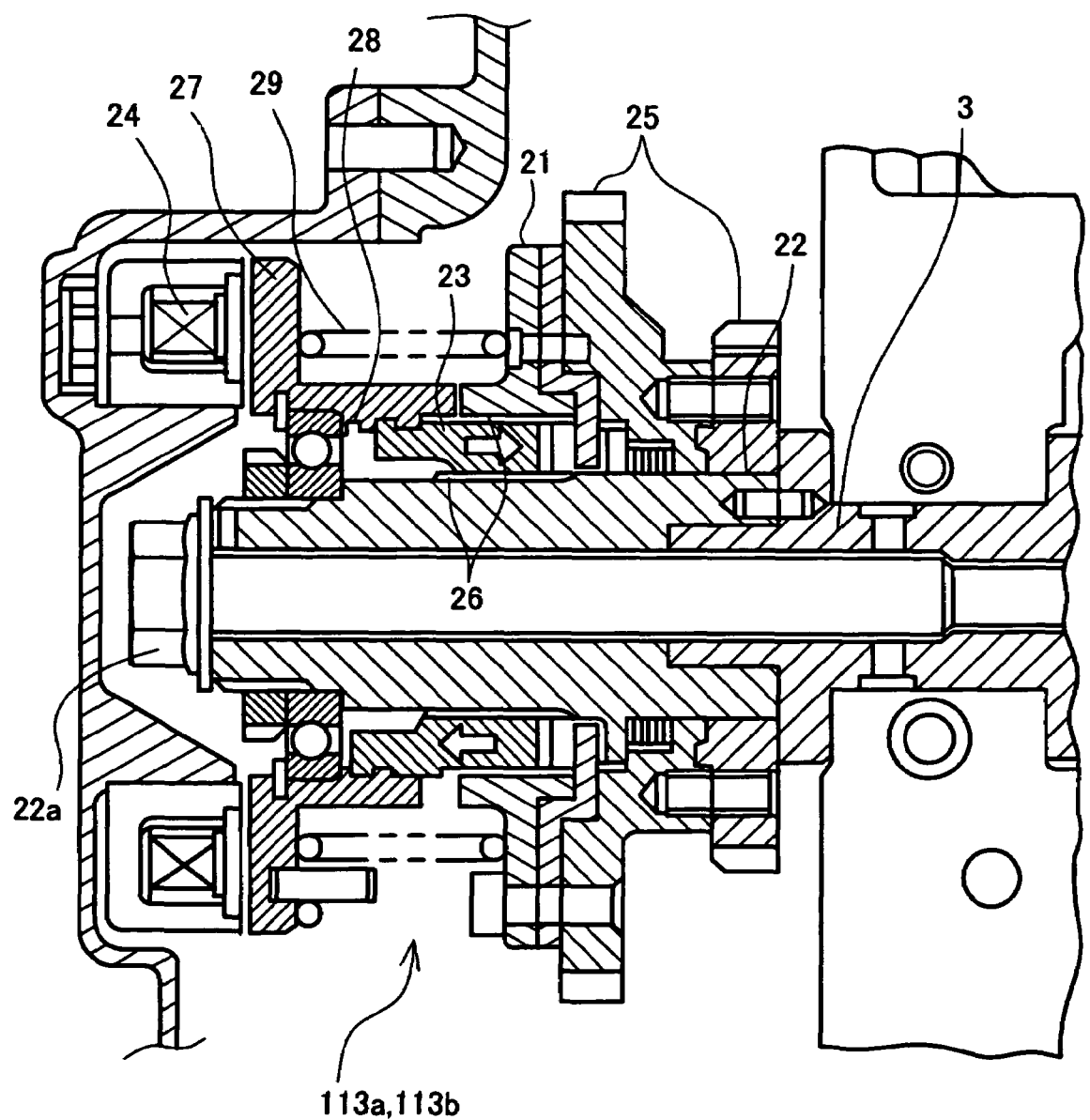
FIG. 4 is a cross-sectional view showing a variable valve timing mechanism in the embodiment of the present invention.

Next, there will be provided a description of a structure of variable valve lift mechanism 112a, 112b, and a structure of variable valve timing mechanism 113a, 113b, based on FIGS. 2 through 4.

In V-type engine 101 in the present embodiment, a pair of intake valves 105, 105 is disposed to each cylinder, and above intake valves 105, 105, an intake valve drive shaft 3 which is driven to rotate by the crankshaft is rotatably supported to extend in a direction along a cylinder train.

Swing cams 4 each of which is in contact with a valve lifter 2a of intake valve 105 to drive to open or close intake valve 105, are fitted to an outer surface of intake valve drive shaft 3, so as to be rotatable relative to intake drive shaft 3.

Between intake valve drive shaft 3 and swing cam 4, variable valve lift mechanism 112a, 112b which continuously varies the operating angle of intake valve 105 as well as the valve lift amount thereof, is disposed.

Further, on one end portion of intake valve drive shaft 3, there is disposed variable valve timing mechanism 113a, 113b which changes a rotation phase of intake valve drive shaft 3 relative to the crankshaft to continuously vary the phase of the center of the operating angle of intake valve 105.

As shown in FIGS. 2 and 3, each variable valve lift mechanism 112a, 112b includes: a drive cam 11 of circular shape which is fixedly disposed on intake valve drive shaft 3 in an eccentric state; a link 12 of ring shape which is fitted to an outer surface of drive cam 11 to be rotatable relative to drive cam 11; a control shaft 13 which extends in a direction of the cylinder train to be in approximately parallel with intake valve drive shaft 3; a control cam 14 of circular shape which is fixedly disposed on control shaft 13 in an eccentric state; a locker arm 15 which is fitted to an outer surface of control cam 14 to be rotatable relative to control cam 14, and also, is connected at one end thereof to a tip end of link 12 of ring shape; and a link 16 of rod shape which is connected to the other end of locker arm 15 and to swing cam 4. It should be noted that for the brevity sake, only one of the valve lift mechanisms 112a and 112b is shown in FIGS. 2 and 3.

Control shaft 13 is driven to rotate by a motor 17 via a gear train 18.

According to the above configuration, when intake valve control shaft 3 cooperates with the crankshaft to be rotated, ring shaped link 12 performs the approximate translation via drive cam 17, and also, locker arm 15 swings about the center axis of control cam 14, and swing cam 4 swings via rod shaped link 16, so that intake valve 105 is driven to open or close.

Further, by changing a rotating angle of control shaft 13, a position of the axle center of control cam 14, which is the swing center of locker arm 15, is changed, so that the orientation of swing cam 4 is changed.

As a result, the operating angle of intake valve 105 and the lift amount thereof are continuously changed to be increased or decreased, while the phase of the center of the operating angle of intake valve 105 being approximately fixed.

FIG. 4 shows each variable valve timing mechanism 113a, 113b.

Variable valve timing mechanism 113a, 113b is fixed to a sprocket 25 which is rotated in synchronism with the crankshaft, and includes: a first rotator 21 which is rotated integrally with sprocket 25; a second rotator 22 which is fixed to the one end of intake valve drive shaft 3 by means of a bolt 22a, to be rotated integrally with intake valve drive shaft 3; and an intermediate gear 23 of cylindrical shape which is engaged with an inner peripheral face of first rotator 21 and with an outer peripheral face of second rotator 22, by means of helical splines 26.

A drum 27 is connected to intermediate gear 23 via a triple thread screw 28, and a torsion spring 29 is disposed between drum 27 and intermediate gear 23 via first rotator 21.

Intermediate gear 23 is urged to a retarded angle direction (left direction in FIG. 4) by torsion spring 29, and when a voltage is applied to an electromagnetic retarder 24 to thereby generate a magnetic force, intermediate gear 23 is moved to an advance angle direction (right direction in FIG. 4), via drum 27 and triple thread screw 28.

A relative phase between rotators 21 and 22 is changed according to an axial position of intermediate gear 23, so that the rotation phase of intake valve drive shaft 3 relative to the crankshaft is changed, and the phase of the center of the operating angle of intake valve 105 is continuously changed.

Motor 17 and electromagnetic retarder 24 are controlled to be driven based on control signals from electronic control unit 114.

In the present embodiment, electronic control unit 114 includes a function of learning a dispersion in intake air quantity between each bank due to a characteristic dispersion in the variable valve actuation device which is configured by combining variable valve lift mechanism 112a, 112b and variable valve timing mechanism 113a, 113b.

A detail description of the learning of intake air quantity will be provided hereinbelow.

Figure 5:
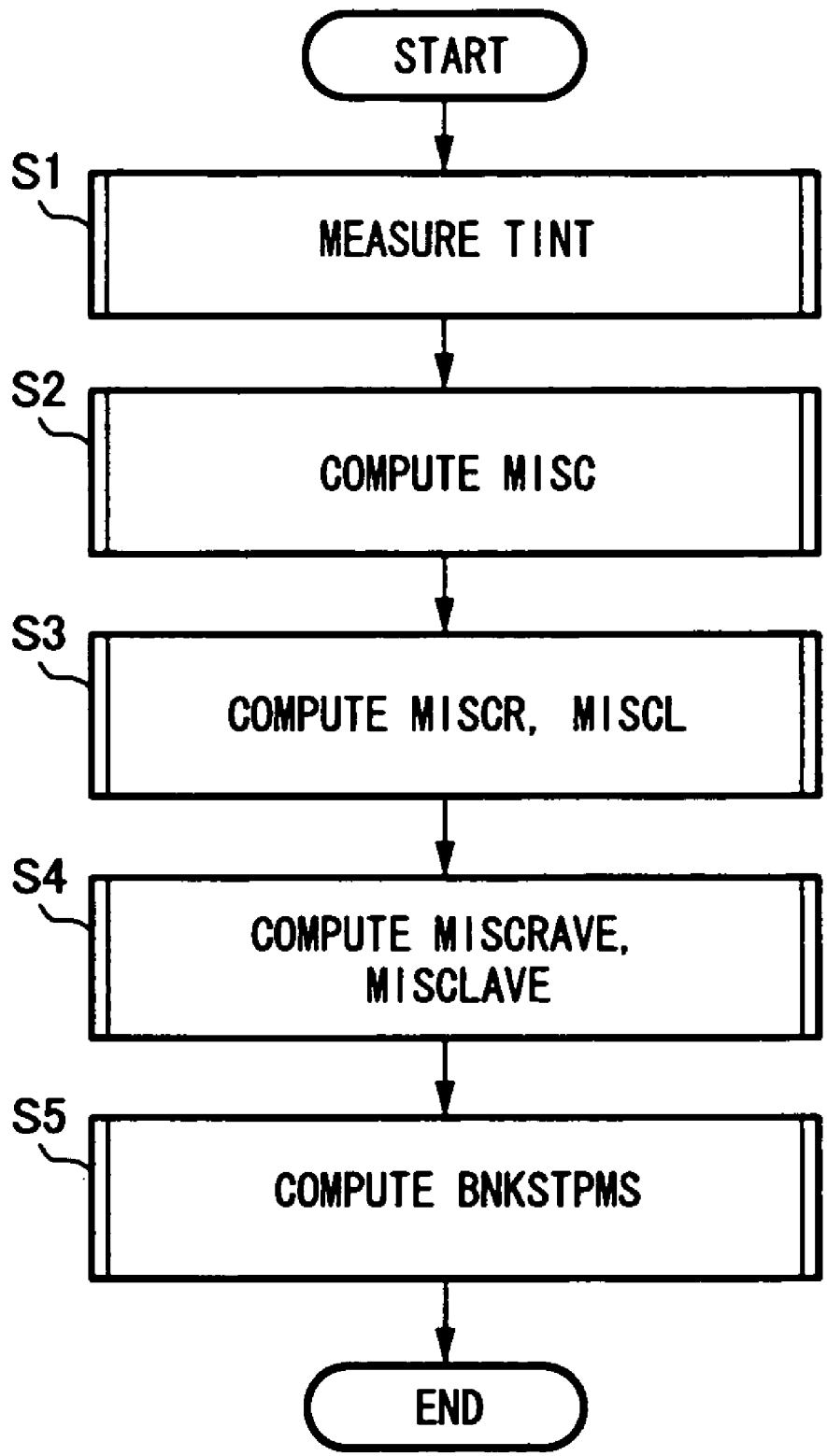
FIG. 5 is a flowchart showing a first embodiment of a means for detecting a torque difference between each bank in the present invention.

A flowchart in FIG. 5 shows a first embodiment of a means for detecting a torque difference between each bank, in which the torque difference is computed based on the detection signal from crank angle sensor 117.

Firstly, in step S1, a reference crank angle position at each 180° if the engine is the four-cylinder engine or at each 120° if the engine is the six-cylinder engine, based on the detection signal from crank angle sensor 117. Then, measurement of a cycle TINT at which the reference crank angle position is detected is conducted.

In step S2, based on the cycle TINT, a parameter MISC indicating the torque difference between the cylinders whose strokes are deviated from each other by one rotation, is computed.

In the computation of the parameter MISC, for the cycle TINT, all of data of the newest value TINT1 through the previous data of TINTn that have occurred before the predetermined number of cycles are stored in time series. Namely, "n" of TINTn is a positive integer, and accordingly, if "n"=2, an immediately previous value is indicated, and if "n"=3, a value before the immediately previous value is indicated.

Then, the following calculation is performed at each time when a detection value of the cycle TINT is updated.

[In the Case of the Four-Cylinder Engine]

$$MISB = \frac{2 \times (TINT5 + TINT7) + 2 \times (TINT5 - TINT3)}{TINT7^3 \times TP}$$

$$MISC = MISB2 - MISB3$$

[In the Case of the Six-Cylinder Engine]

$$MISB = \frac{2 \times (TINT7 - TINT10) + 2 \times (TINT7 - TINT4)}{TINT9^3 \times TP}$$

$$MISC = MISB2 - MISB3$$

In the above formulae, TP is a basic fuel injection quantity (basic injection pulse width). Further, MISB2 is an immediately previous value of a parameter MISB, and MISB3 is a value before that immediately previous value MISB2 of the parameter MISB.

In step S3, the parameter MISC is divided into a component for the right bank and that for the left bank.

Further, in step S4, average values MISCRAVE and MISCLAVE are obtained for each bank.

Then, in step S5, a torque difference BNKSTPM between both banks is obtained as a difference between the average values MISCRAVE and MISCLAVE.

BNKSTPMS=MISCRAVE−MISCLAVE

Figure 6:
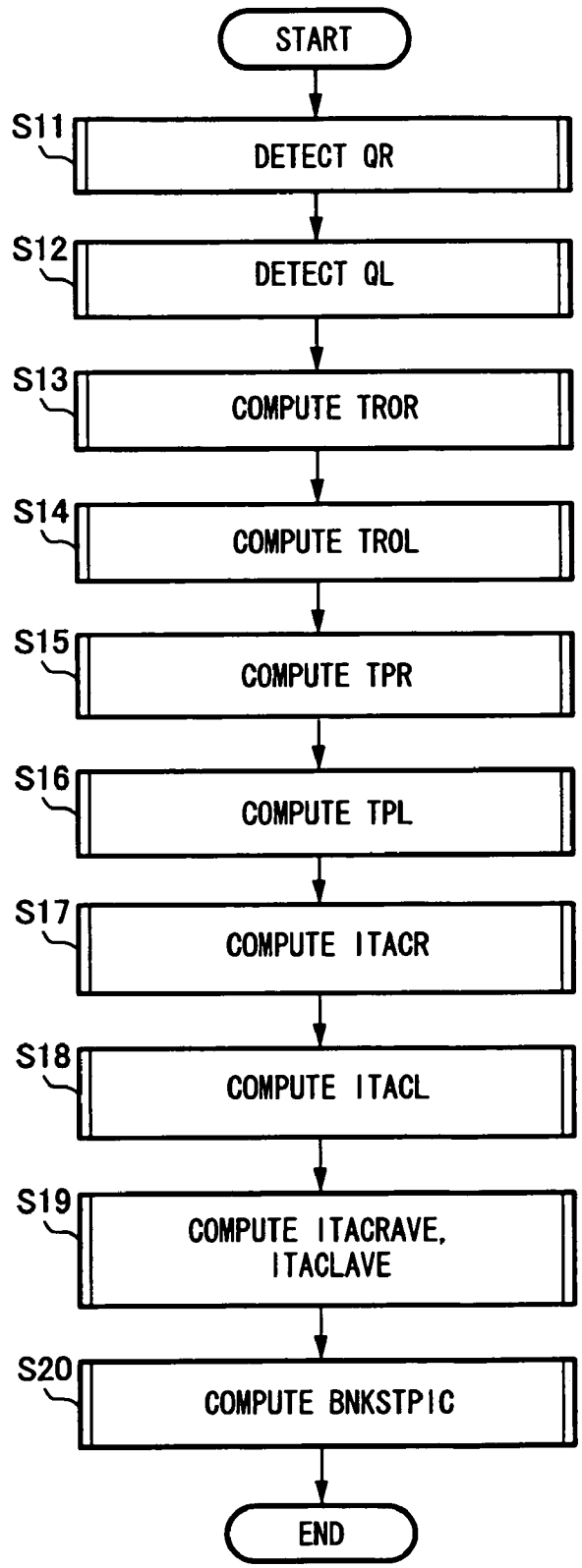
FIG. 6 is a flowchart showing a second embodiment of the means for detecting a torque difference between each bank in the present invention.

A flowchart in FIG. 6 shows a second embodiment in which the torque difference between both banks is obtained as a difference in intake air quantity between those banks.

In the second embodiment, airflow meter 115 for the right bank and air flow meter 115 for the left bank are provided for individually measuring the intake air flow quantity for each of the banks.

In step S11, an intake air flow quantity QR in the right bank is detected based on the detection signal from air flow meter 115 provided in the right bank.

In step S12, an intake air flow quantity QL in the left bank is detected based on the detection signal from air flow meter 115 provided in the left bank.

In step S13, a basic fuel injection quantity Tp0R in proportion to a cylinder air quantity in the right bank is computed.

TP0R=K×QR/N where K is a constant and N is an engine rotation speed.

In step S14, a basic fuel injection quantity Tp0L in proportion to a cylinder air quantity in the left bank is computed.

TP0L=K×QL/N

In step S15, the basic fuel injection quantity Tp0R in the right bank is subjected to the smoothing processing, and a result thereof is decided to be TPR.

In step S16, the basic fuel injection quantity Tp0L in the left bank is subjected to the smoothing processing, and a result thereof is decided to be TPL.

In step S17, the filling efficiency ITACR in the right bank is computed using the basic fuel injection quantity TPMAX# at the time when intake valve is fully opened.

ITACR=TPR/TPMAX#

In step S18, the filling efficiency ITACL in the left bank is computed using the basic fuel injection quantity TPMAX# at the time when intake valve is fully opened.

ITACL=TPR/TPMAX#

In step S19, the filling efficiency ITACR in the right bank and the filling efficiency ITACL in the left bank, are respectively subjected to the smoothing processing, and results thereof are decided to be ITACRAVE and ITACLAVE.

In step S20, a filling efficiency difference BNKSTPIC between both banks is computed based on a difference between the averaged filling efficiency ITACRAVE in the right bank and the averaged filling efficiency ITACLAVE in the left bank.

BNKSTPIC=ITACRAVE−ITACLAVE

Figure 7:
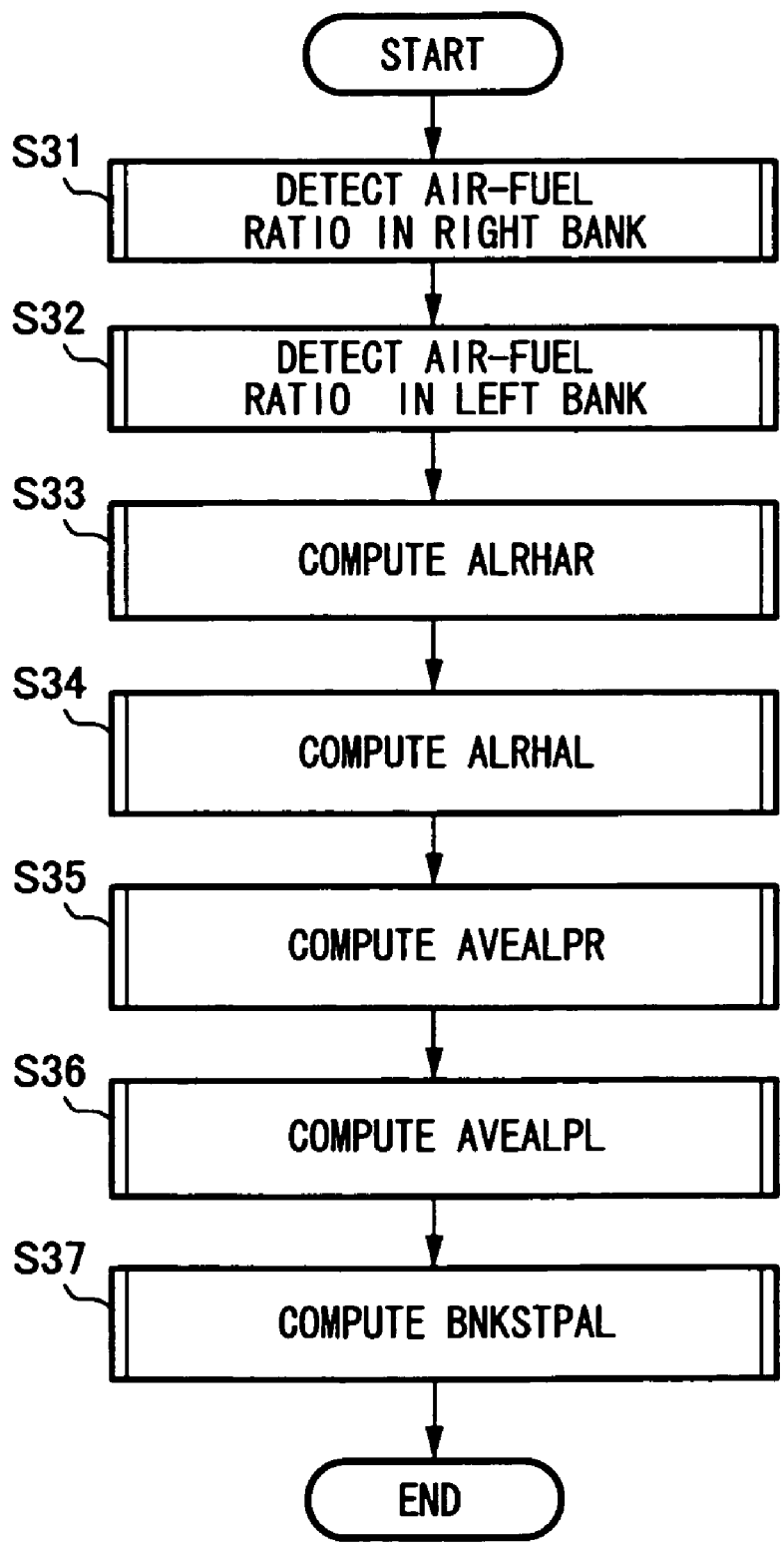
FIG. 7 is a flowchart showing a third embodiment of the means for detecting a torque difference between each bank in the present invention.

A flowchart in FIG. 7 shows a third embodiment in which the torque difference between both banks is obtained as a difference in air-fuel ratio between respective banks.

In step S31, the detection signal from oxygen sensor 111a in the right bank is read out.

In step S32, the detection signal from oxygen sensor 111b in the left bank is read out.

In step S33, a feedback correction coefficient ALPHAR of the fuel injection quantity for coinciding the air-fuel ratio in the right bank with a target air-fuel ratio, is computed based on the detection signal from the oxygen sensor 111a in the right bank.

In step 34, a feedback correction coefficient ALPHAR of the fuel injection quantity for coinciding the air-fuel ratio in the left bank with a target air-fuel ratio, is computed based on the detection signal from the oxygen sensor 111b in the left bank.

In step S35, the air-fuel ratio feedback correction coefficient ALPHAR in the right bank is subjected to the smoothing processing, and a result thereof is decided to be AVEALPR.

In step S36, the air-fuel ratio feedback correction coefficient ALPHAL in the left bank is subjected to the smoothing processing, and a result thereof is made to be AVEALPL.

In step S37, an air-fuel ratio difference BNKSTPAL between respective banks is computed based on a difference between the averaged correction coefficient AVEALPR in the right bank and the averaged correction coefficient AVEALPL in the left bank.

BNKSTPAL=AVEALPR−AVEALPL

Figure 8:
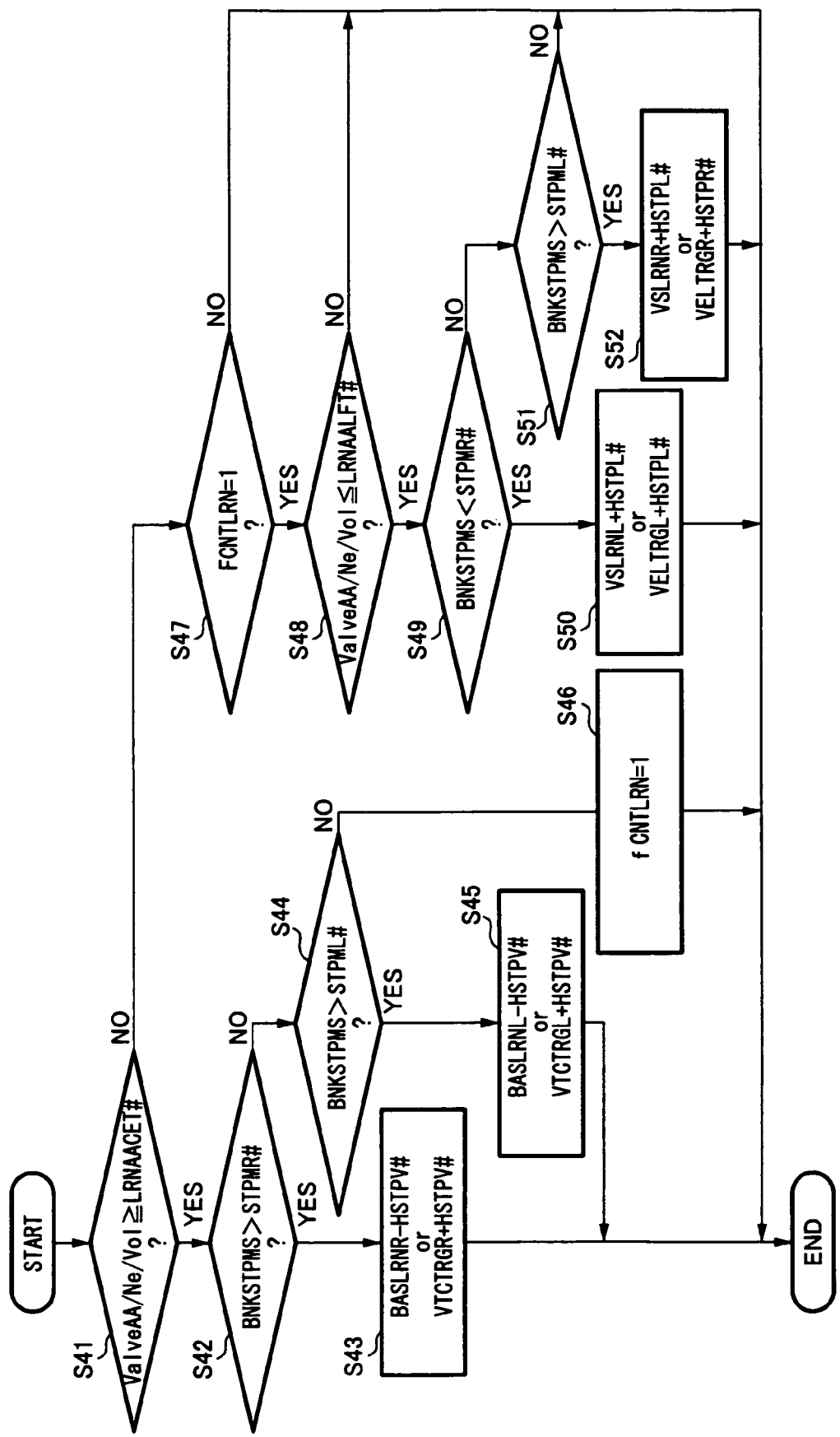
FIG. 8 is a flowchart showing a first embodiment of a learning control in the present invention.

A flowchart in FIG. 8 shows a control for correcting the torque difference between both banks, based on the torque difference BNKSTPMS obtained in the flowchart of FIG. 5.

In step S41, it is determined whether or not a determination value obtained by dividing an opening area ValveAA of intake valve 105 by an engine rotating speed Ne and the total stroke volume Vol (determination value=ValveAA/Ne/Vol) is equal to or larger than a first threshold LRNAACET#.

Incidentally, it should be understood that ECU 114 can estimate the above-mentioned opening area ValveAA from a manipulated variable of variable valve lift mechanism 112a, 112b.

Figure 9:
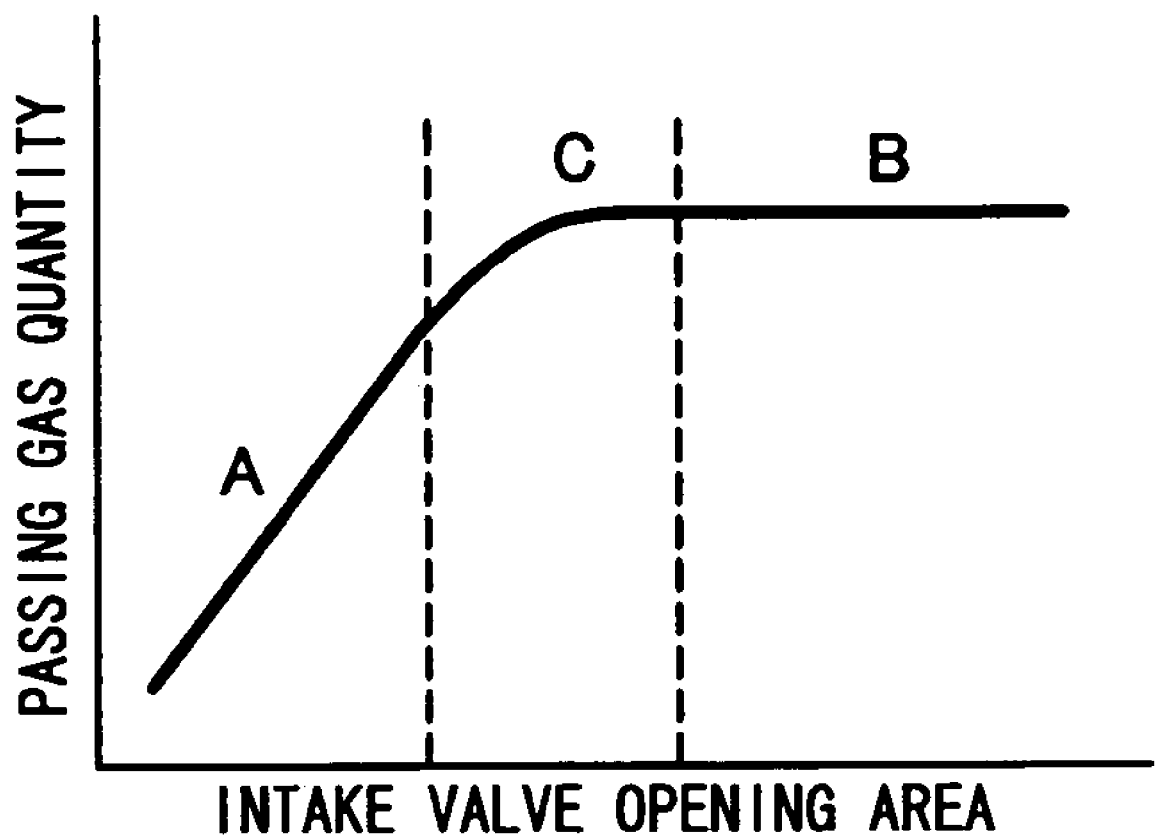
FIG. 9 is a graphical view showing segments in a learning region in the present invention.

As shown in FIG. 9, a region in which the determination value (=ValveAA/Ne/Vol) that is a quantity of state in relation to the valve opening area is equal to or larger than the first threshold LRNAACET#, corresponds to a region (B) where a quantity of gas passing through intake valve 105 is not largely changed so that the phase of the center of the operating angle of intake valve 105 significantly influences on the passing gas quantity.

When the determination value (=ValveAA/Ne/Vol) is equal to or larger than the first threshold LRNAACET#, the routine proceeds to step S42 where it is determined whether or not the torque difference BNKSTPMS is smaller than a threshold STPMR# (<0).

When the torque difference BNKSTPMS is smaller than the threshold STPMR#, it means that the MISC average value in the left bank is larger than the MISC average value in the right bank. In other words, it means that the valve timing of intake valve 105 in the right bank is retarded relative to the valve timing of intake valve 105 in the left bank, so that the intake air quantity in the right bank becomes larger than the intake air quantity in the left bank.

Therefore, when the torque difference BNKSTPMS is smaller than the threshold STPMR#, the routine proceeds to step S43 where a most retarded angle learning value BASLRNR of the valve timing of intake valve 105 in the right bank is set to be reduced by a predetermined value HSTPV# in order to further advance the valve timing of intake valve 105 in the right bank.

The phase of the center of the operating angle of intake valve 105 is measured as a phase angle spanning from the reference crank angle position to a reference cam angle position. Then, a result obtained by subtracting an actually measured phase angle from the most retarded angle learning value BASLRNR is calculated as an advance angle amount from the most retarded angle position, and feedback control of variable valve timing mechanism 113a, 113b is performed so that the advance angle amount coincides with a target advance angle amount.

Then, the valve timing of intake valve 105 is quickened, to thereby quicken the closing timing of intake valve 105 to a timing prior to the bottom dead center, so that the intake air quantity is decreased.

Accordingly, if the most retarded angle learning value BASLRNR is set to be decreased by a predetermined value HSTPV#, the advance angle amount is detected to be smaller, so that the valve timing of intake valve 105 is advanced so as to compensate for the decreased value.

The center phase of intake valve 105 in the right bank is corrected to be in the advance angle side, so that the intake air quantity in the right bank, which is larger than the intake air quantity in the left bank, is corrected to become smaller, to thereby reduce the torque difference between both banks.

Incidentally, it is possible make correction of an advance angle target value VTCTRGR of the valve timing of intake valve 105 in the right bank by increasing it by the predetermined value HSTPV#, to thereby correct intake valve 105 to be situated in the further advance angle side, in stead of the decrease setting of the most retarded angle learning value BASLRNR by the predetermined value HSTPV#.

On the other hand, if it is determined in step S42 that the torque difference BNKSTPMS is equal to or larger than the threshold STPMR#, the routine proceeds to step S44.

In step S44, it is determined whether or not the torque difference BNKSTPMS is larger than a threshold STPML# (STPML#>0).

When the torque difference BNKSTPMS is larger than the threshold STPML#, it means that the MISC average value in the right bank is larger than the MISC average value in the left bank. In other words, it means that the valve timing of intake valve 105 in the right bank is advanced relative to the valve timing of intake valve 105 in the left bank, so that the intake air quantity in the right bank becomes smaller than the intake air quantity in the left bank.

Therefore, when the torque difference BNKSTPMS is larger than the threshold STPML#, the routine proceeds to step S45 where a most retarded angle learning value BASLRNL of the valve timing of intake valve 105 in the left bank is set to be decreased by the predetermined value HStPV#, or a target advance angle value VTCTRL of the valve timing of intake valve 105 in the left bank is corrected to be increased by the predetermined value HSTPV#.

As a result, the valve timing of intake valve 105 in the left bank is corrected to be in a further advance angle side, and the intake air quantity in the left bank, which is larger than the intake air quantity in the right bank, is corrected to be decreased, so that the torque difference between respective banks is reduced.

As described in the above, it is determined that the torque difference between respective banks in the region where the determination value (=ValveAA/Ne/Vol) is equal to or larger than the first threshold LRNAACET#, is caused by a characteristic dispersion in variable valve timing mechanism 113a, 113b, and the valve timing of intake valve 105 in each bank is corrected so that the torque difference between both banks is reduced.

Then, when STPMR#≦BNKSTPMS≦STPML# and it is determined that the torque difference between each bank is sufficiently small, the routine proceeds to step S46 where 1 is set to a center phase learning completion flag FCNTLRN.

On the other hand, if it is determined in step S41 that the determination value (=ValveAA/Ne/Vol) is smaller than the first threshold LRNAACET#, the routine proceeds to step S47.

In step S47, it is determined whether or not 1 is set to the flag FCNTLRN, namely, whether or not the learning of the characteristic dispersion in variable valve timing mechanism 113a, 113b is terminated.STPM Then, in the case where the flag FCNTLRN is 0 and the learning of the characteristic dispersion in variable valve timing mechanism 113a, 113b is not terminated, the present routine is terminated without executing the lift learning in step S48 and the subsequent steps.

Consequently, the learning in step S48 and the subsequent steps is executed after the learning of the characteristic dispersion in variable valve timing mechanism 113a, 113b is completed.

If it is determined in step S47 that the flag FCNTLRN is 1 and the learning of the characteristic dispersion in variable valve timing mechanism 113a, 113b is completed, the routine proceeds to step S48.

In step S48, it is judged whether or not the judgment value (=ValveAA/Ne/Vol) is equal to or smaller than a second threshold LRNAALFT# (second threshold LRNAALFT#≦first threshold LRNAACET#).

As shown in FIG. 9, a region where the determination value (=ValveAA/Ne/Vol) is equal to or smaller than the second threshold LRNAALFT#, corresponds to a region (A) where the quantity of gas passing through intake valve 105 is changed relative to the change in the opening area of intake valve 105, and also the passing gas quantity is changed due to the valve timing of intake valve 105.

However, since the dispersion in intake air quantity due to the dispersion in valve timing of intake valve 105 has already been learned, it is determined that the torque difference between both banks in such a region is caused by the dispersion in lift characteristic in variable valve lift mechanism 112a, 112b.

Therefore, if it is determined that the determination value (=ValveAA/Ne/Vol) is equal to or smaller than the second threshold LRNAALFT#, the routine proceeds to step S49 and the subsequent steps, to learn a lift characteristic dispersion in variable valve lift mechanism 112a, 112b.

On the other hand, the case where the determination value (=ValveAA/Ne/Vol) is larger than the second threshold LRNAALFT# corresponds to a non-learning region (C) shown in FIG. 9, and therefore, the present routine is terminated without proceeding to any further steps.

In step S49, similarly to step S42, it is determined whether or not the torque difference BNKSTPMS is smaller than the threshold STPMR# (STPMR#<0).

When the torque difference BNKSTPMS is smaller than the threshold STPMR#, this result indicates the state where the intake air quantity in the right bank becomes larger than the intake air quantity in the left bank, and therefore, the routine proceeds to step S50 where the lift amount of intake valve 105 in the left bank is corrected to become larger.

More specifically, either a minimum lift learning value VSLRNL in the left bank is corrected to be increased by the predetermined value HSTPL#, or a target value VELTRGL of the lift amount in the left bank is corrected to be increased by the predetermined value HSTPL#. If the minimum lift learning value VSLRNL is corrected to be increased by the predetermined value HSTPL#, an anticipated amount of increase in the lift amount as a difference between an actually measured value and the minimum lift learning value VSLRNL is decreased by appearance, and the lift amount is controlled to become larger.

On the other hand, when the torque difference BNKSTPMS is equal to or larger than the threshold STPMR#, the routine proceeds to step S51 where it is determined whether or not the BNKSTPMS is larger than the threshold STPML# (STPML#>0).

In the case where the torque difference BNKSTPMS is larger than the threshold STPML#, the routine proceeds to step S52 where in order to correct the lift amount of intake valve 105 in the right bank to become larger, the minimum lift learning value VSLRNR is corrected so as to be increased by the predetermined value HSTPL#, or a target value VELTRGR is corrected so as to be increased by the predetermined value HSTPL#.

Figure 10:
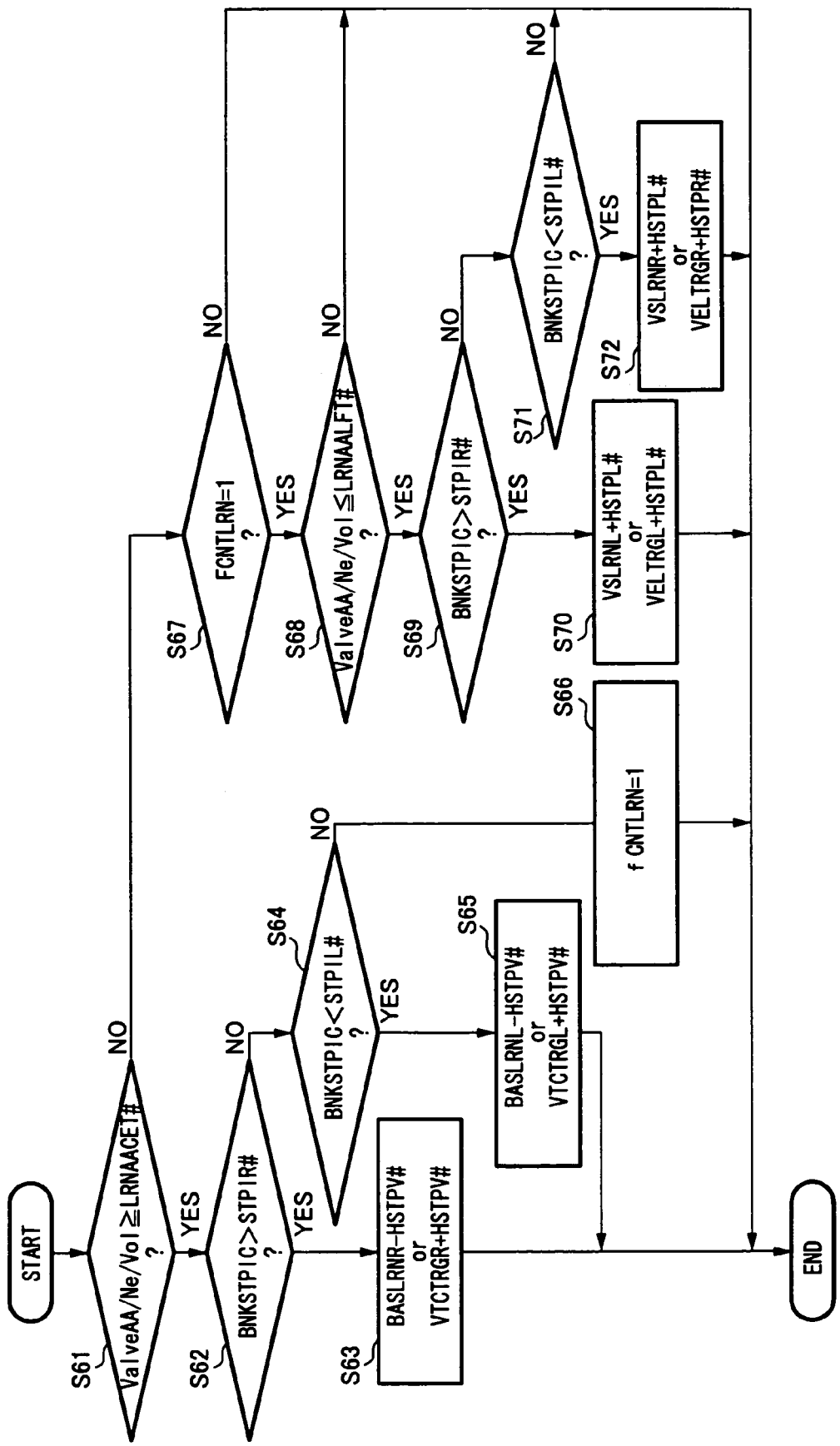
FIG. 10 is a flowchart showing a second embodiment of the learning control in the present invention.

A flowchart in FIG. 10 shows a control for correcting the torque difference between respective banks, based on the filling efficiency difference BNKSTPIC obtained in the flowchart of FIG. 6.

Here, the flowchart in FIG. 10 differs from the flowchart in FIG. 8 only in steps S62, S64, S69 and S71, and in other respective steps of the flowchart in FIG. 10, the processing same as that in the flowchart of FIG. 8 is executed.

The filling efficiency difference BNKSTPIC is calculated as a positive value when the intake air quantity in the right bank is larger than the intake air quantity in the left bank. Therefore, in step S62, it is judged whether or not the filling efficiency difference BNKSTPIC is larger than a threshold STPIR# (STPIR#>0).

Then, when BNKSTPIC>STPIR#, the valve timing of intake valve 105 in the right bank is further advanced, and the routine proceeds to step S63 in order to reduce the intake air quantity in the right bank.

On the other hand, in step S64, it is determined whether or not the filling efficiency difference BNKSTPIC is smaller than a threshold STPIL# (STPIL#<0), so as to determine whether or not the intake air quantity in the left bank is larger than the intake air quantity in the right bank.

Then, if BNKSTPIC<STPIL#, the valve timing of intake valve 105 in the left bank is further advanced, and the routine proceeds to step S65 in order to reduce the intake air quantity in the left bank.

Similarly, if it is determined in step S69 that BNKSTPIC is larger than STPIR# (BNKSTPIC>STPIR#), the routine proceeds to step S70 in order to increase the lift amount (intake air quantity) of intake valve 105 in the left bank, whereas if it is determined in step S71 that BNKSTPIC is smaller than STPIR# (BNKSTPIC<STPIL#), the routine proceeds to step S71 in order to increase the lift amount (intake air quantity) of intake valve 105 in the right bank.

Figure 11:
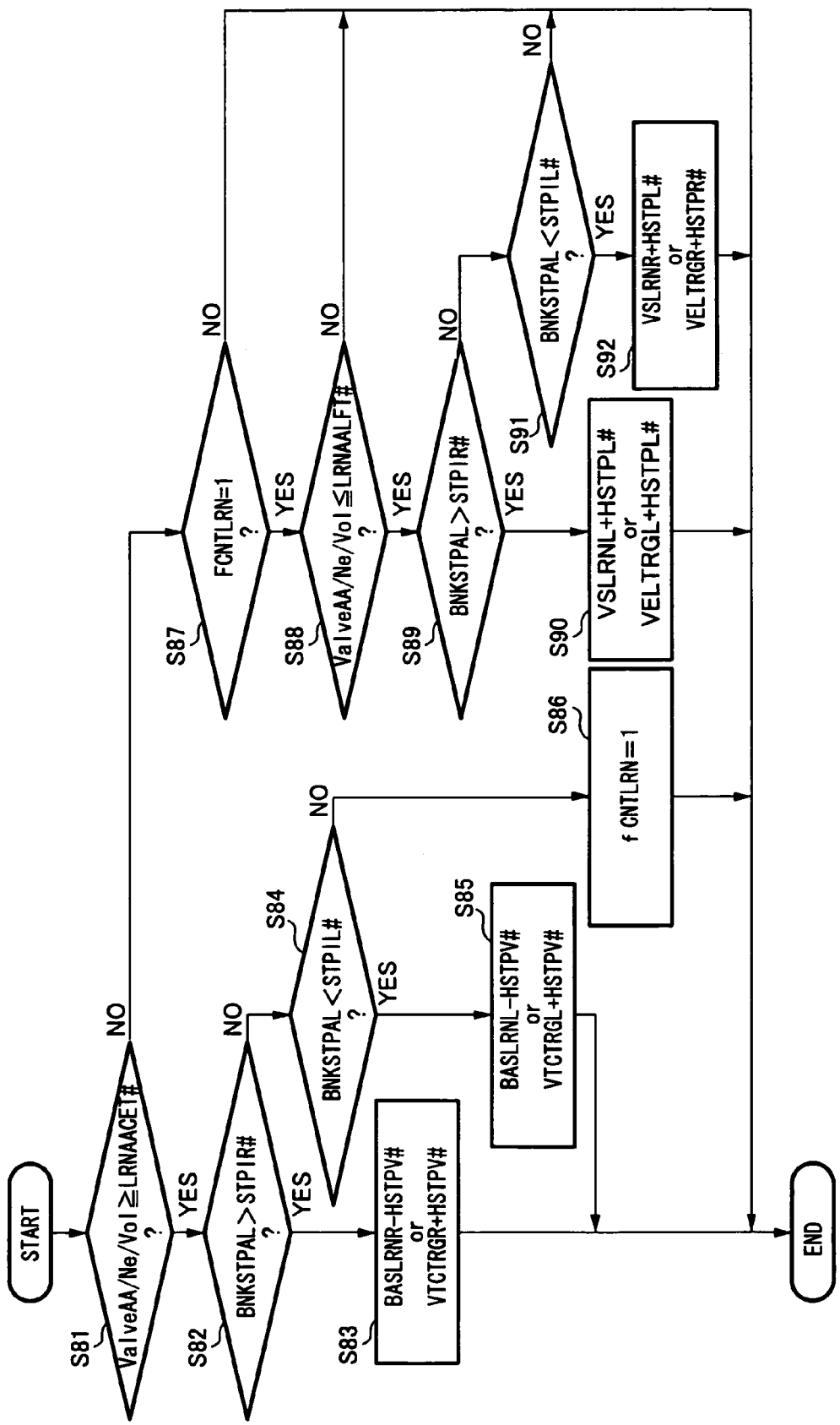
FIG. 11 is a flowchart showing a third embodiment of the learning control in the present invention.

A flowchart in FIG. 11 shows a control for correcting the torque difference between respective banks, based on the air-fuel ratio difference BNKSTPAL obtained in the flowchart of FIG. 7.

Here, the flowchart in FIG. 11 differs from the flowchart in FIG. 8 only in steps S82, S84, S89 and S91, and in other respective steps of the flowchart in FIG. 11, the processing same as that in the flowchart of FIG. 8 is executed.

The air-fuel ratio feedback correction coefficient ALPHAR is set to be a larger value, as the intake air quantity is larger than the fuel quantity so that the air-fuel ratio becomes lean, and the air fuel-ratio difference BNKSTPAL is calculated to be a positive value when the intake air quantity in the right bank is larger than the intake air quantity in the left bank. Therefore, in step S82, it is determined whether or not the air-fuel ratio difference BNKSTPAL is larger than the threshold STPIR# (STPIR#>0).

When BNKSTPAL is larger than STPIR# (BNKSTPAL>STPIR#), the valve timing of intake valve 105 in the right bank is further advanced, and the routine proceeds to step S83 in order to reduce the intake air quantity in the right bank.

On the other hand, in step S84, it is determined whether or not the air-fuel ratio difference BNKSTPAL is smaller than the threshold STPIL# (STPIL#<0), so as to determine whether or not the intake air quantity in the left bank is larger than the intake air quantity in the right bank.

Then, if BNKSTPAL>STPIL# is established, the valve timing of intake valve 105 in the left bank is further advanced, and the routine proceeds to step S85 in order to reduce the intake air quantity in the left bank.

Similarly, if it is determined in step S89 that BNKSTPAL is larger than STPIR# (BNKSTPAL>STPIR#), the routine proceeds to step S90 in order to increase the lift amount (intake air quantity) of intake valve 105 in the left bank, whereas if it is determined in step S91 that BNKSTPAL is smaller than STPIR# (BNKSTPAL<STPIR#), the routine proceeds to step S92 in order to increase the lift amount (intake air quantity) of intake valve 105 in the right bank.

Incidentally, it is possible to determine, based on the velocity of gas passing through intake valve 105, the region for learning the characteristic dispersion in variable valve lift mechanism 112a, 112b, and the region for learning the characteristic dispersion in variable valve timing mechanism 113a, 113b.

Namely, the region for learning the characteristic dispersion in variable valve lift mechanism 112a, 112b is set within a region in which the velocity of gas passing through intake valve 105 reaches the sonic velocity, and the region for learning the characteristic dispersion in variable valve timing mechanism 113a, 113b is set within a region in which the velocity of gas passing through intake valve 105 does not reach the sonic velocity. Then, similarly to the embodiment described above, after the learning of the characteristic dispersion in variable valve timing mechanism 113a, 113b is completed, the learning of the characteristic dispersion in variable valve lift mechanism 112a, 112b is executed.

Whether the velocity of gas passing through intake valve 105 reaches the sonic velocity or does not reach the sonic velocity can be judged by detecting front and rear pressures of intake valve 105.

Then, the processing in each step of comparing the judgment value (=ValveAA/Ne/Vol) with the threshold is rewritten to the processing of judging whether the velocity of gas passing through intake valve 105 reaches the sonic velocity or does not reach the sonic velocity. Thereby, it is possible to learn individually the characteristic dispersion in variable valve lift mechanism 112a, 112b and the characteristic dispersion in variable valve timing mechanism 113a, 113b.

Further, the first and second thresholds to be compared with the determination value (=ValveAA/Ne/Vol) may be set so that the first threshold is equal to the second threshold, i.e., LRNAACET#=LRNAALFT#. However, if a region in which the learning is not executed is set on the provision that the second threshold is larger than the first threshold (LRNAALFT#<LRNAACET#), it is possible to avoid that the characteristic dispersion is erroneously learned in a region in which a change in the passing gas quantity is not stabled relative to the change in the opening area of intake valve 105.

Incidentally, in the above embodiment, the dispersion in intake air quantity between respective banks in the V-type engine is corrected. However, for example in an in-line engine, it is possible to adopt a control technique in which learning of the deviation of actual intake air quantity from an intake air quantity predicted based on the manipulated variable of a variable valve mechanism is executed separately for the deviation depending on the valve timing and for the deviation depending on the lift characteristics. Further, the learning of the characteristic dispersion can be executed for each individual bank in the V-type engine or in the horizontally opposed engine.

Figure 12:
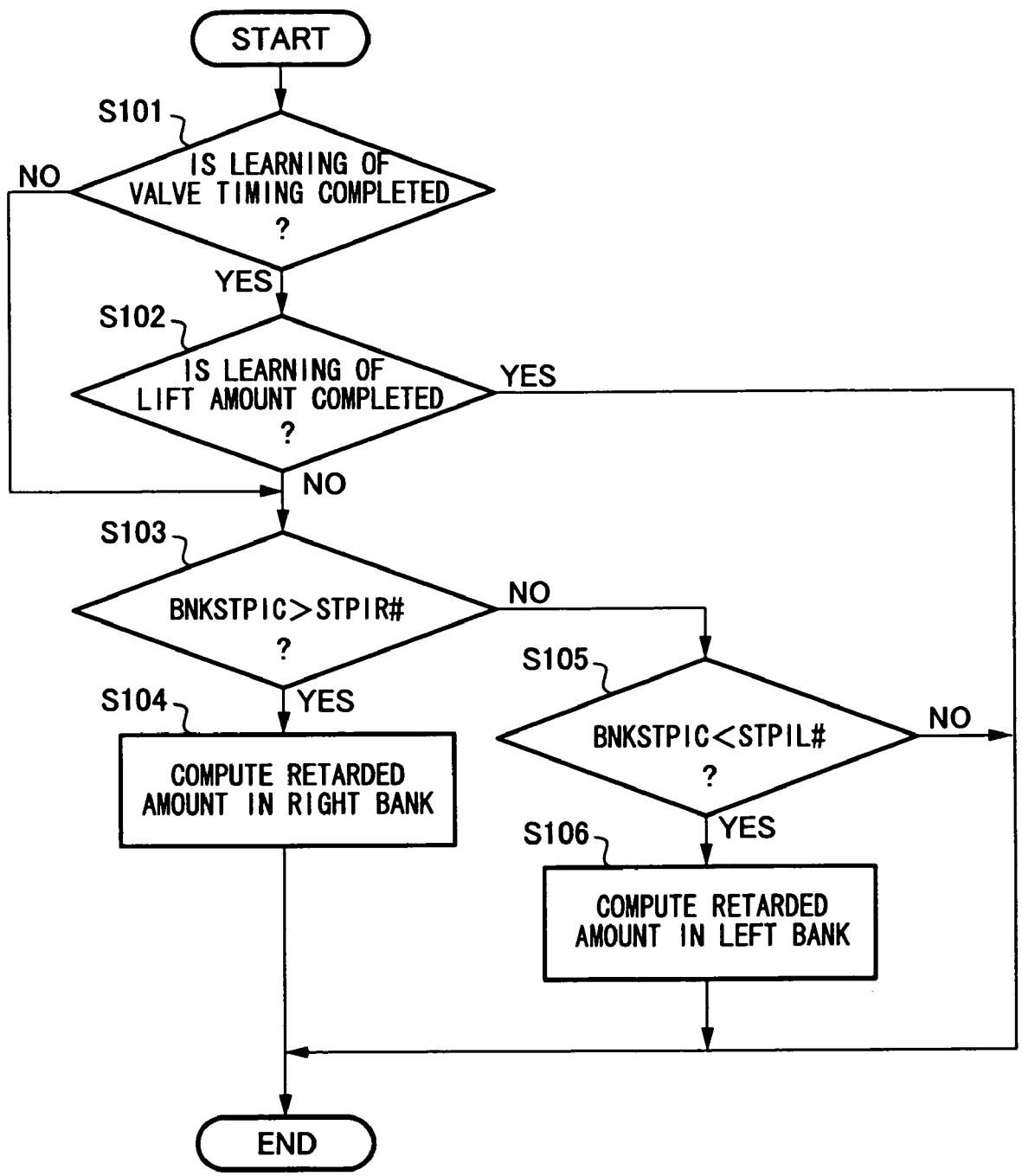
FIG. 12 is a flowchart showing a first embodiment of ignition timing correction in the present invention.

Further, in the present embodiment, the ignition timing correction shown in a flowchart of FIG. 12 is executed, so that the torque difference between each of the banks is not neglected during a period of time until the learning of the characteristic dispersion in the variable valve actuation device is completed.

The ignition timing correction in accordance with the flowchart in FIG. 12 corresponds to the detection of the filling efficiency difference BNKSTPIC in accordance with the flowchart in FIG. 6 and the learning of the characteristic dispersion in accordance with the flowchart in FIG. 10.

Firstly, in step S101, it is determined whether or not the learning of the dispersion in valve timing between respective banks is completed.

Whether or not the learning of the dispersion in valve timing between the banks is completed can be determined, based on the learning completion flag FCNTLRN.

In the present embodiment, as described in the above, the learning of the lift characteristic dispersion is executed after the completion of the learning of the valve timing dispersion. Therefore, when the learning of the valve timing dispersion is not completed, also the learning of the lift characteristic dispersion is not completed.

Accordingly, if it is determined in step S101 that the learning of the valve timing dispersion was not completed, since there is a possibility that the torque difference between respective banks occurs due to the dispersion in intake air quantity between the banks, the routine proceeds to step S103 in order to execute the ignition timing correction.

On the other hand, if it is determined in step S101 that the learning of the valve timing dispersion was completed, the routine proceeds to step S102 where it is determined whether or not the learning of the lift characteristic dispersion is completed.

In the case where it is determined in step S102 that the learning of the lift characteristic dispersion was completed, it is determined that the dispersion in intake air quantity between respective banks due to the characteristic dispersion in the variable valve actuation device was eliminated. Accordingly, since there is no need to eliminate the torque difference between respective banks by the ignition timing correction, the present routine is terminated without proceeding to any further steps.

On the other hand, when it is judged in step S102 that the learning of the lift characteristic dispersion was not completed, there is a possibility that although the learning of the valve timing dispersion is executed, the dispersion in intake air quantity between respective banks still remains due to the lift characteristic dispersion. Therefore, the routine proceeds to step S103 in order to execute the ignition timing correction.

In step S103, it is determined whether or not the filling efficiency difference BNKSTPIC is larger than the threshold STPIR# (STPIR#>0).

When the filling efficiency difference BNKSTPIC is larger than the threshold STPIR#, since the intake air quantity in the right bank is larger than the intake air quantity in the left bank, the routine proceeds to step S104 where the ignition timing in the right bank is retarded, to execute the correction for reducing the torque occurred in the right bank.

On the other hand, when the filling efficiency difference BNKSTPIC is equal to or smaller than the threshold STPIR#, the routine proceeds to step S105 where it is determined whether or not the filling efficiency difference BNKSTPIC is smaller than the threshold STPIL# (STPIL#<0).

When the filling efficiency difference BNKSTPIC is smaller than the threshold STPIL#, since the intake air quantity in the left bank is larger than the intake air quantity in the right bank, the routine proceeds to step S106 where the ignition timing in the left bank is retarded, to execute the correction for reducing the torque occurred in the left bank.

Figure 13:
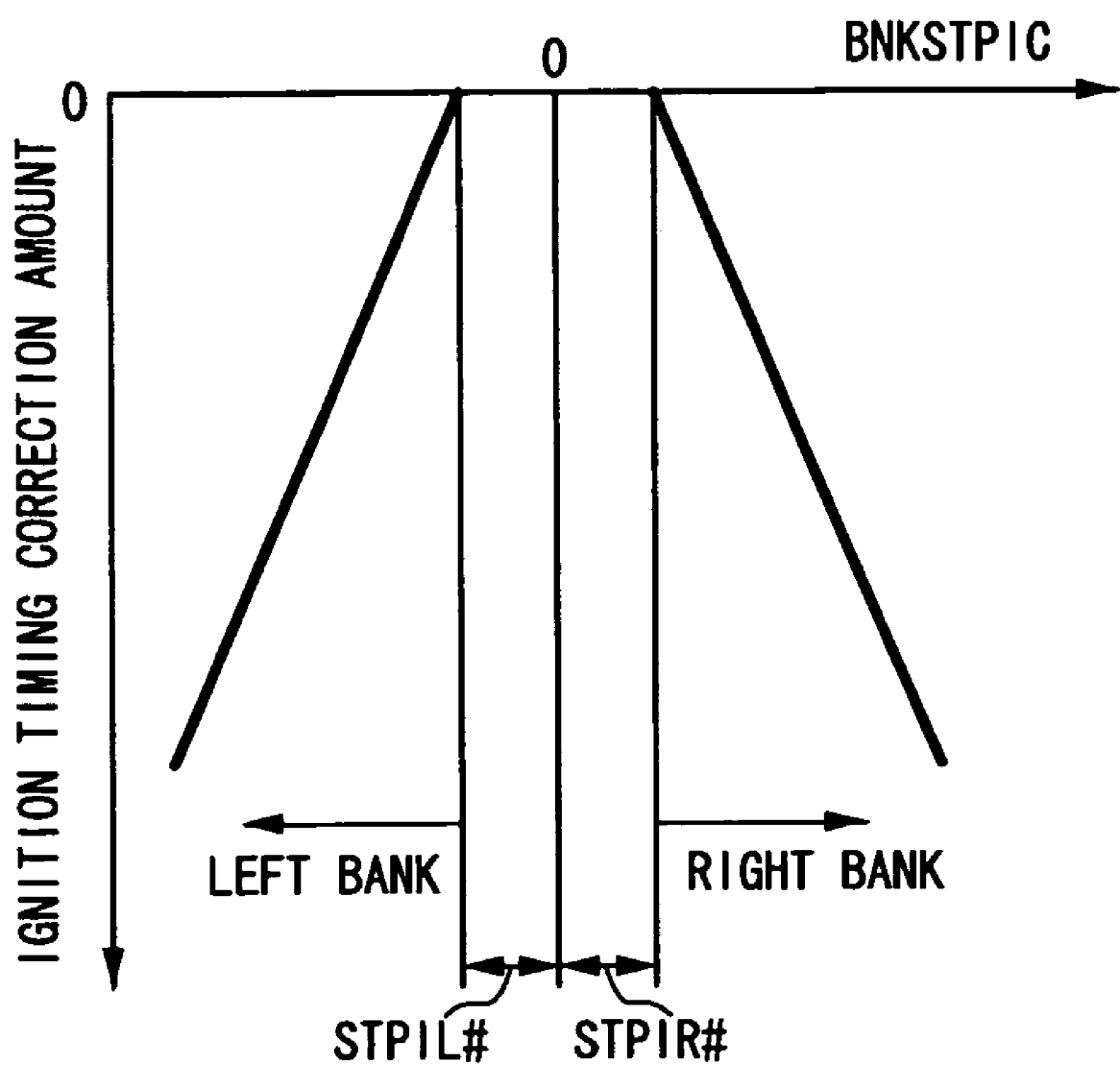
FIG. 13 is a graphical view showing a characteristic of a correction amount of ignition timing in the control shown in the flowchart of FIG. 10.

In the retarding correction of the ignition timing in each of steps S104 and S106, as shown in FIG. 13, a retarding correction amount is made larger as an absolute value of the filling efficiency difference BNKSPTIC becomes larger, namely, as the dispersion in intake air quantity is larger.

By correcting the ignition timing as in the above-described manner, it is possible to avoid an occurrence of the torque difference between both banks during the period of time until the characteristic dispersion between respective banks in the variable valve actuation device is learned, and also, it is possible to maintain the stability of the engine rotation or the silence of the engine.

Next, there will be described, in accordance with a flow-chart in FIG. 14, a correction control of the ignition timing, which corresponds to the embodiment in which the air-fuel ratio difference BNKSTPAL is detected in accordance with the flowchart in FIG. 7 and the learning of the dispersion is executed in accordance with the flowchart in FIG. 11.

Figure 14:
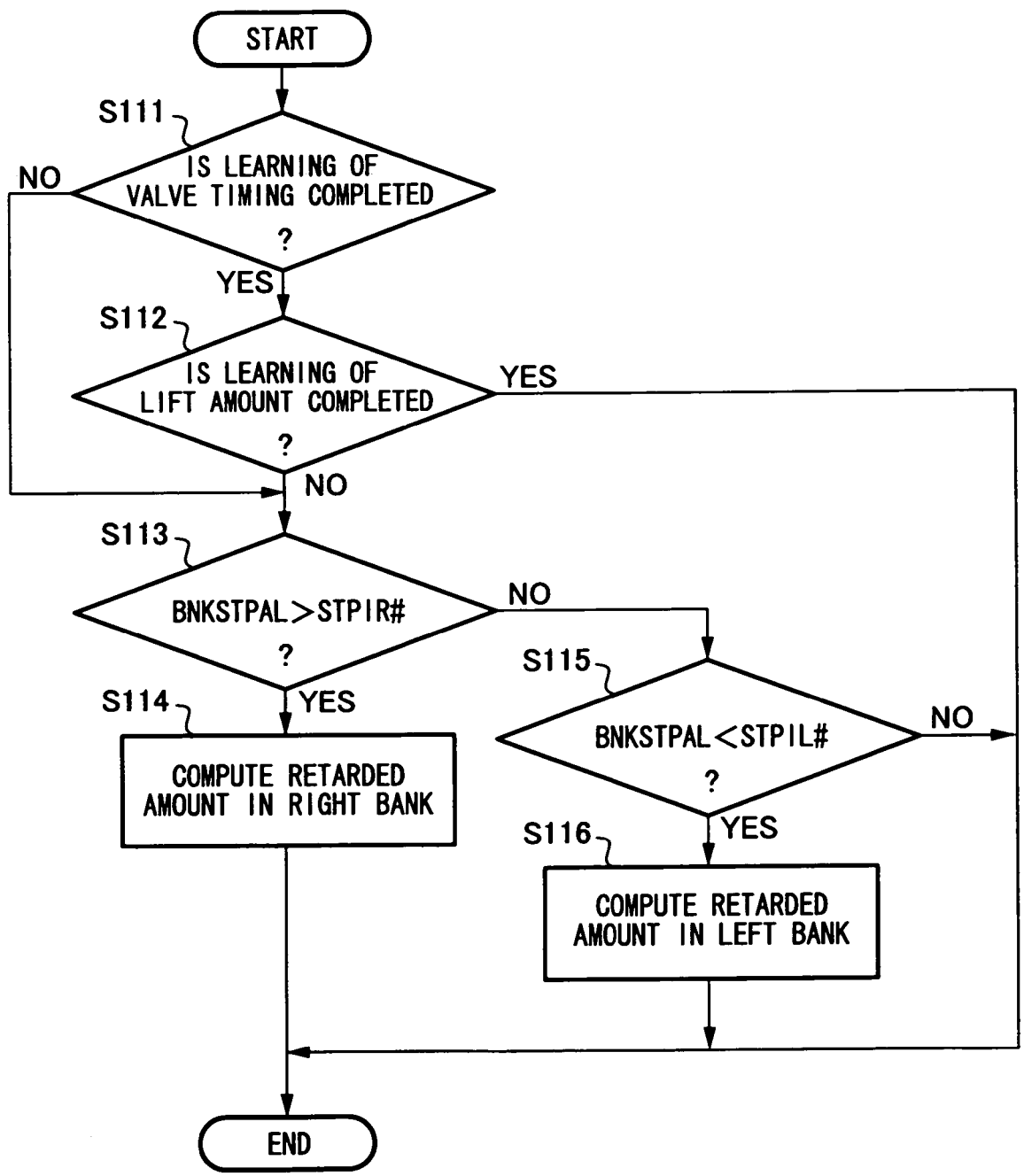
FIG. 14 is a flowchart showing a second embodiment of the ignition timing correction in the present invention.
Figure 15:
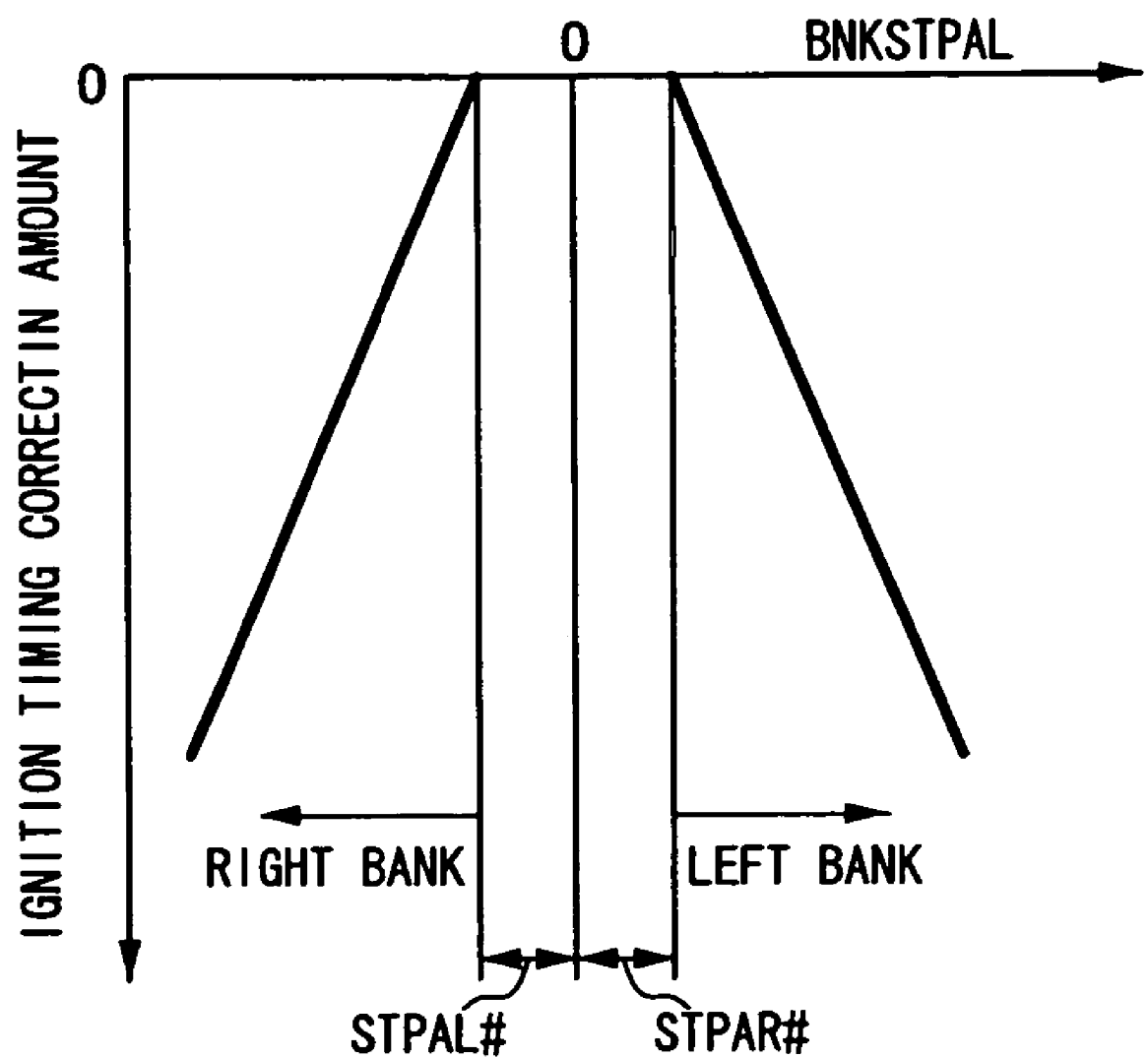
FIG. 15 is a graphical view showing a characteristic of a correction amount of ignition timing in the control shown in the flowchart of FIG. 12.

In the flowchart in FIG. 14, the processing same as that in each step of the flowchart in FIG. 12 is executed, except that a parameter to be compared with the threshold in steps S113 and S115 is the air-fuel ratio difference BNKSTPAL. Further, as shown in FIG. 15, a characteristic of the retarding correction amount to the air-fuel ratio difference BNKSTPAL is same as the characteristic of the retarding correction amount to the filling efficiency difference BNKSTPIC shown in FIG. 13.

The entire contents of Japanese Patent Application No. 2005-090616 filed on Mar. 28, 2005 and Japanese Patent Application No. 2005-090617 filed on Mar. 28, 2005, priorities of which are claimed, are incorporated herein by reference.

While only selected embodiments have been chosen to illustrate and describe the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and not for the purpose of limiting the invention as defined by the appended claims and their equivalents.

We claim:

1. A variable valve actuation control apparatus for an internal combustion engine, comprising:
 a variable valve actuation device which varies a phase of the center of an operating angle of an intake valve and lift characteristics thereof;
 a first learning section that learns an error in intake air quantity which depends on said phase;
 a second learning section that learns an error in intake air quantity which depends on said lift characteristics;
 a selecting section that operates said first learning section in a region in which an opening area of said intake valve is determined to be larger than a first threshold, and operates said second learning section in a region in which the opening area of said intake valve is smaller than a second threshold which is less than or equal to said first threshold; and
 a control section that controls said variable valve actuation device, based on said learned errors in intake air quantity.

2. A variable valve actuation control apparatus for an internal combustion engine, comprising:
 a variable valve actuation device which varies a phase of the center of an operating angle of an intake valve and lift characteristics thereof;
 a first learning section that learns an error in intake air quantity which depends on said phase;
 a second learning section that learns an error in intake air quantity which depends on said lift characteristics;
 a selecting section that operates either said first learning section or said second learning section, based on whether or not the velocity of gas passing through said intake valve is the sonic velocity; and
 a control section that controls said variable valve actuation device, based on said learned errors in intake air quantity.

3. A variable valve actuation control apparatus for an internal combustion engine, comprising:
 a variable valve actuation device which varies a phase of the center of an operating angle of an intake valve and lift characteristics thereof;
 a first learning section that learns an error in intake air quantity which depends on said phase;
 a second learning section that learns an error in intake air quantity which depends on said lift characteristics;
 a selecting section that operates either said first learning section or said second learning section. based on a quantity of state of an intake system in said engine, and operates said second learning section at a time when the quantity of state of the intake system in said engine arrives at a condition for operating said second learning section and also the learning in said first learning section was completed; and
 a control section that controls said variable valve actuation device, based on said learned errors in intake air quantity.

4. A variable valve actuation control apparatus for an internal combustion engine including a plurality of banks, the apparatus comprising:
 a variable valve actuation device which is provided in each bank and which varies a phase of the center of an operating angle of an intake valve and lift characteristics thereof:
 a first learning section that learns the torque difference between respective banks which depends on said phase;
 a second learning section that learns the torque difference between respective banks which depends on said lift characteristics;
 a selecting section that operates either said first learning section or said second learning section, based on a quantity of state of an intake system in said engine; and
 a control section that controls individually said variable valve actuation device in each bank, to reduce said torque differences between respective banks.

5. The apparatus according to claim 4, wherein said first learning section and said second learning section each detects the torque difference between respective banks, based on the fluctuation in an engine rotating speed.

6. The apparatus according to claim 4, wherein said first learning section and said second learning section each detects a torque difference between each bank, based on a difference in intake air quantity between respective banks.

7. The apparatus according to claim 4, wherein said first learning section and said second learning section each detects the torque difference between respective banks, based on a difference in air-fuel ratio between respective banks.

8. A variable valve actuation control apparatus for an internal combustion engine, comprising:
 a variable valve actuation device which varies a phase of the center of an operating angle of an intake valve and lift characteristics thereof;
 a first learning section that learns an error in intake air quantity which depends on said phase;

a second learning section that learns an error in intake air quantity which depends on said lift characteristics;

a selecting section that determines whether a quantity of state of the intake system corresponds to a region B where said first learning section is operated, a region A where said second learning section is operated, or a region C between said region A and said region B where neither said first learning section nor said second learning section is operated, and then operates either said first learning section or said second learning section when it is determined that said quantity of state corresponds to said region A or said region B; and a control section that controls said variable valve actuation device, based on said learned errors in intake air quantity.

9. A variable valve actuation control apparatus for an internal combustion engine including a plurality of banks, the apparatus comprising:

a variable valve actuation device which is provided in each of the banks and which varies a phase of the center of an operating angle of an intake valve and lift characteristics thereof;

a first learning section that learns an error in intake air quantity which depends on said phase;

a second learning section that learns an error in intake air quantity which depends on said lift characteristics;

a selecting section that operates either said first learning section or said second learning section, based on a quantity of state of an intake system in said engine;

a control section that controls said variable valve actuation device, based on said learned errors in intake air quantity; and a torque correcting section that corrects individually, in each bank, controlled variable of said internal combustion engine so that the torque difference occurred between each bank is reduced, during a period of time until the learning in said first learning section and the learning in said second learning section are completed.

10. The apparatus according to claim 9, wherein said torque correcting section individually corrects ignition timing in each bank, so that the torque difference occurred between respective banks is reduced.

11. The apparatus according to claim 10, wherein said torque correcting section sets a correction amount of the ignition timing according to a difference in intake air quantity between respective banks.

12. A control method of a variable valve actuation device which varies a phase of the center of an operating angle of an intake valve and lift characteristics thereof, in an internal combustion engine, comprising the steps of:

determining whether or not an opening area of said intake valve corresponds to a first region in which the opening area of said intake valve is larger than a first threshold;

determining whether or not the opening area of said intake valve correseponds to a second region in which the opening area of said intake valve is smaller than a second threshold which is less than or equal to said first threshold;

learning an error in intake air quantity which depends on said phase, when it is determined that said opening area corresponds to said first region;

learning an error in intake air quantity which depends on said lift characteristics, when it is determined that said opening area corresponds to said second region; and controlling said variable valve actuation device, based on said learned errors in intake air quantity.

13. A control method of a variable valve actuation device which varies a phase of the center of an operating angle of an intake valve and lift characteristics thereof, in an internal combustion engine, comprising the steps of:

determining whether a Quantity of state of an intake system in said engine corresponds to a first region in which an error in intake air Quantity which depends on said phase is learned or a second region in which an error in intake air quantity which depends on said lift characteristics is learned, based on whether or not the velocity of gas passing through said intake valve is the sonic velocity;

learning the error in intake air quantity which depends on said phase, when it is determined that said quantity of state corresponds to said first region;

learning the error in intake air quantity which depends on said lift characteristics, when it is determined that said quantity of state corresponds to said second region; and controlling said variable valve actuation device, based on said learned errors in intake air quantity.

\* \* \* \* \*